(12) United States Patent
Sangary et al.

(10) Patent No.: US 9,002,292 B2
(45) Date of Patent: Apr. 7, 2015

(54) METHOD AND SYSTEM FOR CHARACTERIZING A RADIO CHANNEL OF A WIRELESS NETWORK USING VARIABILITY OF SYNCHRONIZATION

(75) Inventors: Nagula Tharma Sangary, Waterloo (CA); Sean Bartholomew Simmons, Waterloo (CA); David Blaine Dietz, Waterloo (CA); Perry Jarmuszewski, Waterloo (CA); Oleksiy Kravets, Petersburg (CA)

(73) Assignee: Blackberry Limited, Waterloo, Ontario (CA)

( * ) Notice: Subject to any disclaimer, the term of this patent is extended or adjusted under 35 U.S.C. 154(b) by 414 days.

(21) Appl. No.: 13/405,767

(22) Filed: Feb. 27, 2012

(65) Prior Publication Data

US 2012/0157027 A1      Jun. 21, 2012

Related U.S. Application Data

(63) Continuation of application No. 12/394,464, filed on Feb. 27, 2009, now Pat. No. 8,160,503.

(51) Int. Cl.
*H04B 17/00* (2006.01)
(52) U.S. Cl.
CPC ........ *H04B 17/0042* (2013.01); *H04B 17/0067* (2013.01); *H04B 17/0077* (2013.01)
(58) Field of Classification Search
USPC ..................................................... 455/67.16
See application file for complete search history.

(56) References Cited

U.S. PATENT DOCUMENTS

| | | |
|---|---|---|
| 5,055,849 A | 10/1991 | Andersson et al. |
| 5,396,253 A | 3/1995 | Chia |
| 5,513,221 A | 4/1996 | Parr et al. |
| 5,883,921 A | 3/1999 | Andren et al. |
| 6,529,850 B2 | 3/2003 | Wilborn et al. |
| 6,798,853 B1 | 9/2004 | Lindbom et al. |
| 6,832,080 B1 | 12/2004 | Arslan et al. |
| 6,987,971 B2 | 1/2006 | Kirsch |
| 7,065,375 B2 | 6/2006 | Bonhomme |
| 7,218,934 B2 | 5/2007 | Juncker et al. |
| 2002/0037911 A1 | 3/2002 | Desai et al. |
| 2003/0054771 A1 | 3/2003 | Chappaz |

(Continued)

FOREIGN PATENT DOCUMENTS

| | | |
|---|---|---|
| EP | 1052820 | 11/2000 |
| WO | 97/34372 | 9/1997 |

(Continued)

OTHER PUBLICATIONS

3GPP TS25.304.
R4-071366 NTT docomo, Tmobile "Speed dependent scaling of cell reselection parameters".

(Continued)

*Primary Examiner* — Sibin Chen

(57) ABSTRACT

A speed parameter or channel quality parameter are determined in a mobile device based on variation in frequency offset measurement. A higher variation in the frequency offset measurement reflects a poorer channel quality and a higher speed; a lower variation in the frequency offset measurement reflects a better channel quality and a lower speed. The parameter(s) may be fed back to the system and used, for example, to make adaptive modulation and coding decisions.

13 Claims, 12 Drawing Sheets

(56) References Cited

U.S. PATENT DOCUMENTS

| | | |
|---|---|---|
| 2006/0039318 A1 | 2/2006 | Oh et al. |
| 2006/0264231 A1 | 11/2006 | Zhang et al. |
| 2008/0076026 A1 | 3/2008 | Ryu et al. |
| 2008/0099563 A1 | 5/2008 | Wormald et al. |
| 2008/0233945 A1 | 9/2008 | Gummadi et al. |
| 2009/0240464 A1 | 9/2009 | Dietz et al. |
| 2010/0099434 A1* | 4/2010 | Murayama et al. ........ 455/456.1 |

FOREIGN PATENT DOCUMENTS

| | | |
|---|---|---|
| WO | 98/24251 | 6/1998 |
| WO | 2003049466 A1 | 6/2003 |
| WO | 03/077445 | 9/2003 |

OTHER PUBLICATIONS

R4-081873 NTT docomo, Tmobile "Field trial results on Speed dependent scaling of mobility control parameters".

R4-082062 Ericsson "Performance of Mobility State Detection based Cell Reselection".

3GPP TS 36.300 version 8.9.0 Release 8.

3GPP TS 36.104 version 8.0.0 Release 8.

3GPP TS 25.104 Release 8.

3GPP TS 36.104 version 8.3.0 Release 8.

Official Communication issued on Feb. 17, 2011 in respect of European Patent Application No. 09154040.1.

International Search Report and Written Opinion dated May 12, 2010 from International Application No. PCT/CA2010/000240 (8 pages).

* cited by examiner

METHOD AND SYSTEM FOR CHARACTERIZING A RADIO CHANNEL OF A WIRELESS NETWORK USING VARIABILITY OF SYNCHRONIZATION

RELATED APPLICATION

This application is a continuation of application Ser. No. 12/394,464, which was filed on Feb. 27, 2009, which is hereby incorporated by reference.

FIELD

The application relates to methods and systems for characterizing a radio channel of a wireless network.

BACKGROUND

In a wireless environment, impairments of communication channels can affect significantly the performance of a wireless system. Multi-path fading is one of the most significant impairments.

Wireless communication systems such as CDMA, WCDMA, GSM/EDGE typically require accurate timing or synchronization with a base station and this is obtained from the estimation of the frequency of the received RF signal at a mobile device. In some wireless communication systems, the minimum level of accuracy of the frequency is 0.1 part per million (0.1 ppm). However in a typical design this will be about 0.04 ppm and this is achieved through the AFC (automatic frequency controller) system of the mobile device. The AFC system measures the frequency difference between the received RF signal and an onboard frequency and applies a correction in terms of a DC voltage offset to a correction feedback loop to keep the onboard frequency synchronized to the received signal. The onboard frequency may for example be based on a voltage controlled temperature compensated crystal oscillator (VCTCXO) that is relatively stable over a reasonable period of time, so that it can be used for the purpose of measuring Doppler effect to a certain level of accuracy. However, it is difficult or impossible to predict the exact Doppler shift (or frequency offset) at the mobile device for a given moment in time. This can be attributed to many factors such as multi-path (multiple routes a signal takes from the base station to the mobile device), other fading effects due to environmental changes, the variability between base station line-of-sight and the direction of travel of the mobile device, etc.

DETAILED DESCRIPTION

According to a broad aspect, the application provides a method comprising: receiving a signal over a wireless communications channel; making a plurality of frequency offset measurements in respect of the signal; determining a measure of variation of the frequency offset measurements; determining at least one of a channel quality parameter and a speed parameter as a function of the measure of variation of the frequency offset measurements.

According to another broad aspect, the application provides a mobile device comprising: at least one antenna for receiving a signal; a local frequency source; a frequency offset determiner configured to determine frequency offset measurements between a frequency of the local frequency source and a frequency of the signal; a parameter determiner configured to determine a measure of variation of the frequency offset measurements and to determine at least one of a channel quality parameter and a speed parameter as a function of the measure of variation of the frequency offset measurements.

According to another broad aspect, the application provides a computer readable medium having instructions stored thereon for execution by a mobile device, that when executed, cause the mobile device to execute a method comprising, in respect of a signal received over a wireless communications channel: making a plurality of frequency offset measurements in respect of the signal; determining a measure of variation of the frequency offset measurements; determining at least one of a channel quality parameter and a speed parameter as a function of the measure of variation of the frequency offset measurements.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Applicant has observed that the frequency offset of the signal received at a mobile device at various instances in time is somewhat random in nature. Applicant has also observed that the degree of variation of the frequency offset of the received signal is proportional to the speed (or motion) of the mobile device and/or rate of change of the surrounding environment.

Figure 1:
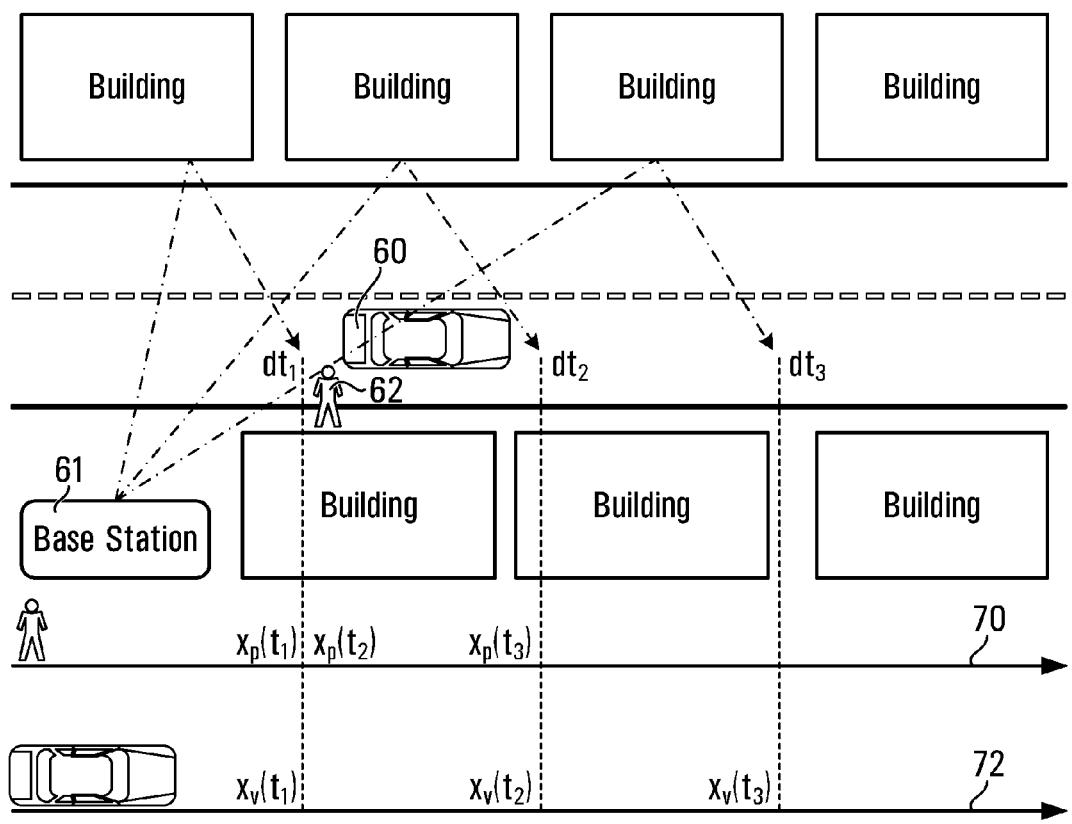
FIG. 1 is a schematic diagram showing a pedestrian and vehicle moving through an urban locale.

A simple example to explain this phenomenon will be described with reference to FIG. 1. Consider a scenario where a car 60 or pedestrian 62 is moving in an environment as shown in FIG. 1 carrying a mobile device. The mobile device updates its timing (or synchronizes) by measuring the frequency offset of a signal received from a base station 61 at time intervals and let this be at $t_1$, $t_2$ and $t_3$. The position of the pedestrian 62 at time $t_1$, $t_2$, $t_3$ is indicated at 70, and the position of the vehicle 60 at times $t_1$, $t_2$, $t_3$ is indicated at 72. Suppose a mobile device moves through this environment at a constant speed of v with an on board clock set to hold the previous frequency accuracy. The mobile device in the vehicle picks up a signal (for example, the strongest component of a multi-path signal) at different points $x_v(t_1)$, $x_v(t_2)$, $x_v(t_3)$ with delays ($dt_1$, $dt_2$ and $dt_3$), which are the time differences between the expected and the actual received signals. The mobile device performs time compensation based on these differences. The mobile device moving at pedestrian speed picks up the signal at positions $x_p(t_1)$, $x_p(t_2)$ and $x_p(t_3)$. The path taken by a signal to $x_p(t_1)$ and $x_p(t_2)$ is basically the same, and results in a delay of about $dt_1$ for both paths (only one shown). Subsequent to time compensation, the mobile device measures residual error as frequency offset $\Delta f$ at each point. The following relationship exists between $\Delta f$ and $\Delta v$:

$$\Delta f = \frac{\Delta v}{\lambda}$$

where $\lambda$ is the wavelength of the signal in free space and is a constant for most practical purposes (it may change slightly under extreme changes in environmental conditions), and $\Delta v$=change in velocity over the same time period. The measured frequency offset can vary between the limit of the control loop of the synchronization circuit and the maximum allowed value of the system; for example these can be 40 and 500 Hz for a signal at 1 GHz. It has been observed that in the case of a pedestrian moving from $x_p(t_1)$ to $x_p(t_2)$, the variation in the frequency offset $\Delta f$, which is obtained from the received signal only from $dt_1$ will be small. In contrast, for a vehicle moving from $x_v(t_1)$ to $x_v(t_2)$, the frequency offset $\Delta f$, is measured at $dt_2$ from the signal at $dt_1$, and the variation in the frequency offset is relatively large compared to the pedestrian case.

Figure 2:
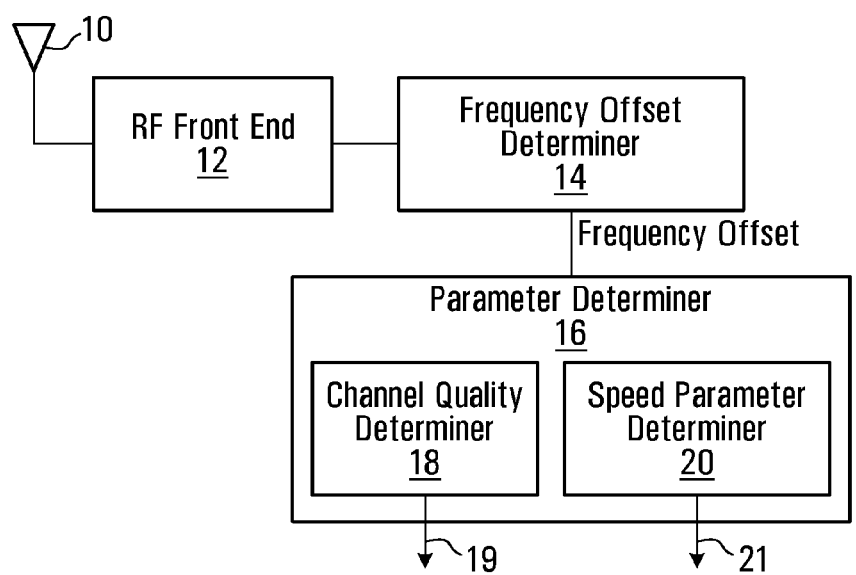
FIG. 2 is a block diagram of a first receiver configured to determine a channel quality parameter or speed parameter based on variation of frequency offset.

FIG. 2 is a block diagram of a mobile device. The mobile device has an antenna 10, RF (radio frequency) front end 12, and frequency offset determiner 14. Also shown is a parameter determiner 16 that determines one or more parameters based on the variation in frequency offset. In the specific example illustrated, parameter determiner 16 includes a channel quality parameter determiner 18 which produces a channel quality parameter output 19 and a speed parameter determiner 20 which produces a speed parameter output 21.

In operation, a signal is received through the antenna 10 and the RF front end 12. The frequency offset determiner determines the frequency offset. The frequency offset measurement is reflective directly or indirectly of a frequency difference between a frequency of the received signal and a frequency in the mobile device. The parameter determiner takes multiple instances of the frequency offset measurement and determines at least one parameter based on the variation of the multiple instances of the frequency offset measurement. For example, the variance of the frequency offset measurements may be used in determining the channel quality parameter and/or speed parameter. In the specific example shown, the channel quality parameter determiner 18 determines a channel quality parameter as a function of variation in the frequency offset measurement. The speed parameter determiner 20 determines a speed parameter as a function of variation in the frequency offset measurement.

Figure 3:
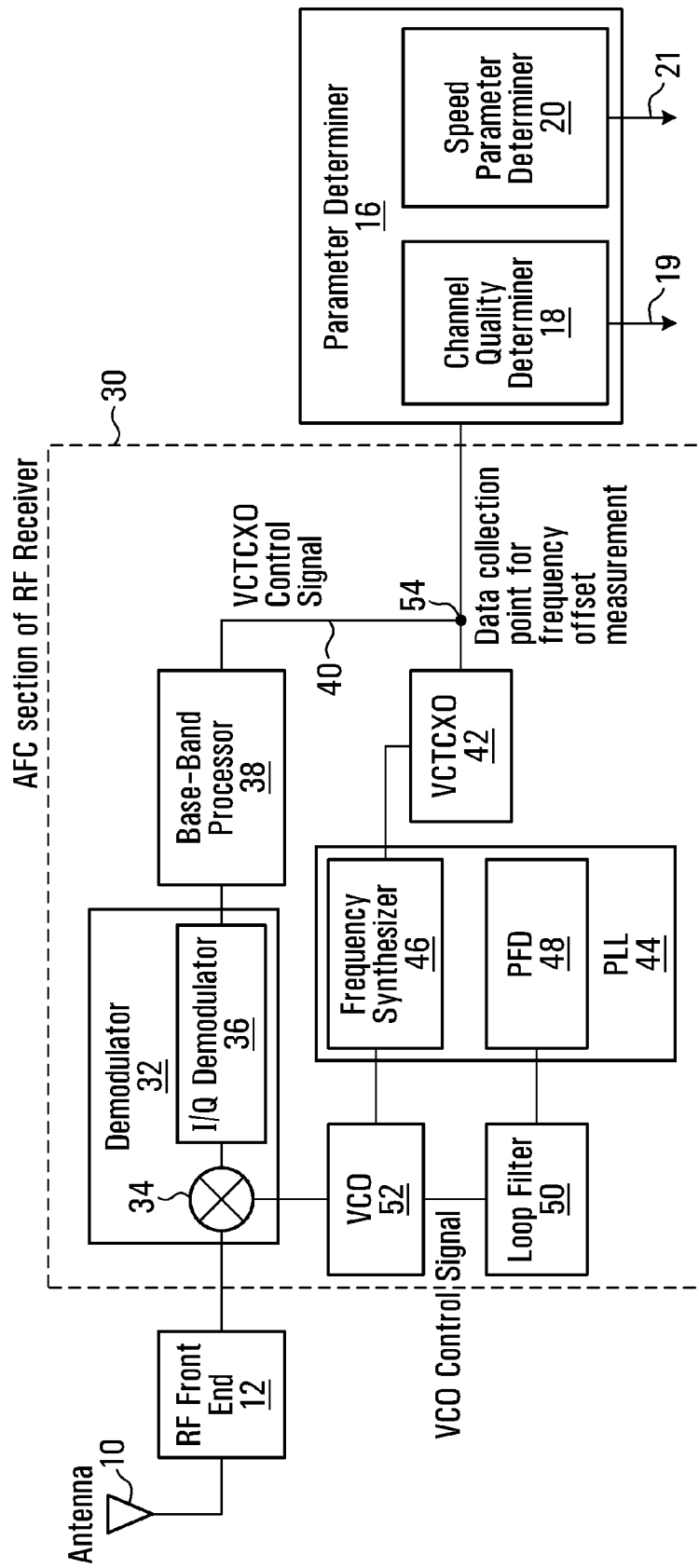
FIG. 3 is a block diagram of a second receiver configured to determine a channel quality parameter or speed parameter based on variation of frequency offset.

FIG. 3 is a block diagram of a mobile device that is a specific example of the mobile device of FIG. 1. The mobile device again has an antenna 10 and RF (radio frequency) front end 12. In this case, the functionality of frequency offset determiner 14 of FIG. 2 is implemented in an AFC (automatic frequency controller) 30. The AFC 30 locks the radio receiver to the desired RF signal. There are many designs/methods by which this could be achieved; one simple design/method is shown in FIG. 3. The RF front-end 12 typically contains components such as an antenna switch, duplexers/diplexers, band pass filters and a low noise amplifier. The RF front-end 12 is connected to a demodulator 32 that in the illustrated example includes a mixer 34 and I/Q demodulator 36. Other or different demodulation components may be present. The output of the demodulator 32 is passed to base-band processor 38. The base-band processor 38 produces a VCTCXO (Voltage Controlled Temperature Compensated Crystal Oscillator) control signal 40 which is input to a VCTCXO 42 which generates the main reference signal for the radio that is input to a PLL (phased locked loop) 44. The PLL 44 contains a frequency synthesizer 46 and phase frequency detector (PFD) 48. An output of the frequency synthesizer 46 is input to a VCO (voltage controlled oscillator) 52 which generates a frequency that is near that of the RF signal. An output of the PFD 48 is passed through loop filter 50 to the VCO 52. It shows a very specific example of an AFC that generates frequency offset which can be used in determining a measure of variation in frequency offset. More generally, any circuit/method for determining these frequency offsets can be employed.

In operation, a received RF signal enters the mixer 34 and mixes with LO (local oscillator) signal from the VCO 52 to produce a mixed signal. In many cases, the mixed signal is a base-band signal and this goes to into the demodulator 36 and then to the base-band processor 38, but the specifics of this depend upon the specific receiver design implemented. The base-band processor 38 generates the VCTCXO control signal 40. The VCTCXO control signal 40 is representative of the frequency offset detected by the base-band processor 38 between the onboard reference clock or frequency and the frequency of the received signal. The PLL 44 will lock the VCO 52 based on the control signal from VCTCXO 42. This process is repeated periodically so long as the receiver is on. The period of adjustment for this complete loop may for example be determined by a requirement in a wireless standard. In FIG. 3, point 54, namely the point where VCTCXO control signal 40 is output by the base band processor 38, is the data collection point for frequency offset measurements. Specifically, the VCTCXO signal produced by the baseband processor 38 is representative of frequency offset determined by the base band processor 38. This is then used in the parameter determiner 16 as described previously.

Figure 4:
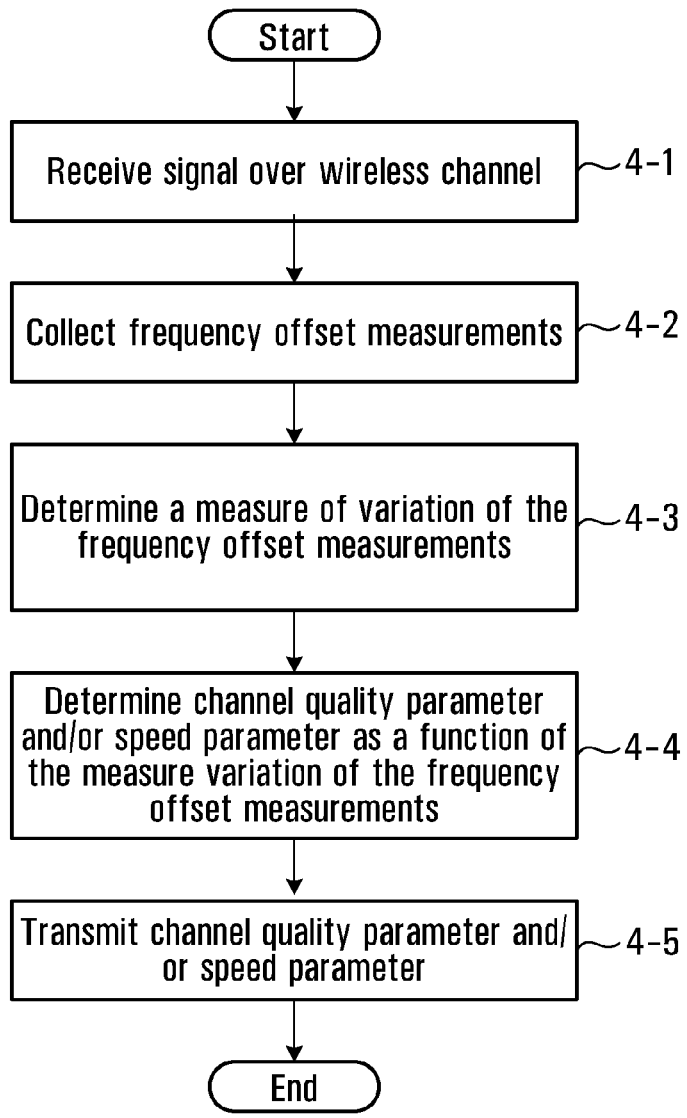
FIG. 4 is a flowchart of a method of determining a channel quality parameter and/or a speed parameter based on frequency offset variation.

Referring now to FIG. 4, shown is a flowchart of a method of determining a channel quality parameter or a speed parameter. In some embodiments, only the channel quality parameter is determined. In other embodiments, only the speed parameter is determined. In further embodiments, both the channel quality parameter and the speed parameter are determined. The method begins at block 4-1 with a mobile device receiving a signal over a wireless channel. In block 4-2, the mobile device collects frequency offset measurements. Note that the frequency offsets need not be absolute measurements of the actual difference in frequency; in some embodiments, they may be scaled representations of the actual difference in frequency. In some embodiments, the mobile device, on an ongoing basis, makes adjustments to a frequency of a local frequency source to synchronize with a remote frequency source. In such a case, the adjustments made can be used as the frequency offset measurements. In some embodiments, a control voltage is generated that reflects the frequency offset. In this case, the control voltage may be an example of a frequency offset measurement. In block 4-3, the mobile device determines a measure of variation of the frequency offset measurements. In block 4-4, the mobile device determines a channel quality parameter and/or speed parameter as a function of the measure of variation of the frequency offset measurements. Block 4-5 is an optional block included in some embodiments, and involves transmitting the channel quality parameter and/or the speed parameter back to the source of the signal such as a wireless access network component, e.g. a base station.

In some embodiments, the speed parameter can be fed back directly; having determined speed, in some embodiments, the channel quality parameter can be determined and fed back. In some embodiments, the channel quality parameter can be determined directly from the variation in the frequency offset.

Determining Parameter(s) Based on Variation in Frequency Offset

Having collected frequency offset measurements, embodiments of the application provide for the determination of various parameters that are a function of variation in the frequency offset. Two specific examples are a channel quality parameter and a speed parameter, each of which are detailed further below.

In some embodiments, the collected frequency offset measurements are used to estimate a probability distribution function (PDF) of the frequency offset. The PDF is then used to determine a measure of variation in the frequency offset. Various techniques for determining an amount of variation from a PDF can be employed to determine the measure of variation in the frequency offset. For example, some measure of width of the PDF may be employed. In a specific example, "width" is determined as follows: normalize the PDF to have a peak of one; determine two points on either side of the normalized peak having a predetermined value (for example 0.5), and determining the distance (along the frequency offset axis) between the two points. The distance is the width of the PDF. In another specific example, the variance of the PDF is employed as the measure of variation. Measurement data shows that the distribution falls very close to the Standard Cauchy Distribution (or a form of Gaussian distribution), which is written as follows:

$$f(x) = \frac{1}{[1 + ((x-t)/s)^2]}$$

The larger the number of samples, the more accurate the estimate of the distribution; however, a larger number of samples may also cover a time period during which the mobility of the user changes, and as such there is a tradeoff between accuracy of the distribution, and the timeliness of the result.

In some embodiments, a number of frequency offset samples is employed that may not necessarily give an accurate overall picture of a corresponding PDF, and rather than generate a PDF first and then determine the variation from the PDF, an approach is employed that determines the variation directly from the set of samples. For example, samples over 20 seconds might be used to determine the variation in frequency offset.

Having collected the frequency offsets over some time interval, a channel quality parameter and/or speed parameter is generated as a function of those measurements.

In some embodiments, one sample per second is collected over N seconds (N=20 is a specific example), and at the end of each N seconds, an updated channel quality parameter and/or speed parameter is computed. Other sampling frequencies or durations can alternatively be employed. In other embodiments, a moving window of N seconds worth of samples is processed on an ongoing basis to generate a channel quality parameter and/or speed parameter.

The following is a specific example of a specific equation that can be used to determine a measure of variation of the frequency offset from a set of frequency offset measurements:

Variation in frequency offset within a time interval having samples from n=1, ..., N:

$$F\_offset\_var=Max\{ABS[measured\_offset(n)-measured\_offset(n-1)]\}$$

In words, the maximum of the absolute value of the difference between two consecutive frequency offsets, over the time period, is used as the measure of variation. More generally, some approaches involve determining differences between consecutive frequency offset measurements, and then determining the measure of variation based on the differences.

Advantageously, the determination of the measure of variability of frequency offset can take place without interacting with the network; the functionality takes place within the device. The methods do not require the mobile device to be connected or be in a call. In some embodiments, this system uses the normal requirements of typical wireless standards, where the mobile device is required to carry out periodic measurement for maintaining synchronization with the base-stations and there are no additional steps required that would result in significant additional energy cost to the mobile device's battery.

Channel Quality Parameter

Having determined a measure of variability of frequency offset, using for example one of the methods described above, a channel quality parameter is determined based on that measure. In general, the lower the variability in the frequency offset, the higher the channel quality; the higher the variability in the frequency offset, the lower the channel quality. In some embodiments, F_offset_var as defined above is used as the channel quality parameter.

Determining the channel quality parameter provides a channel characterization that can be viewed as a mechanism to estimate the fading effect; however, more generally, the methods provide a new channel quality parameter that may or may not directly be representative of the fading effect at a given instant of time. The new channel quality parameter can be used in any context where channel quality metric are used. Specific examples include making AMC (adaptive modulation and coding) decisions, and making data rate determinations.

Determining Speed Parameter

Having determined a measure of variability of frequency offset, using for example one of the methods described above, a speed parameter is determined based on that measure. In general, the lower the variability in the frequency offset, the lower the speed; the higher the variability in the frequency offset, the higher the speed.

In general, the speed parameter can be used in any context where speed information is used. In some embodiments, the speed parameter as a channel quality parameter, the assumption being that a higher speed equates to a lower channel quality and a lower speed equates to a higher channel quality. The speed parameter can then be used in any application where channel quality is used. Specific examples include making AMC (adaptive modulation and coding) decisions, and making data rate determinations.

The speed parameter does not necessarily need to be fed back to the network. For example, in some embodiments the speed parameter is used to control operation of the mobile device. Examples of this type of operation can be found in commonly assigned co-pending U.S. publication no. 2008/0099563 entitled "Automatic Operation of a Wireless Device Based on Physical Speed" which is hereby incorporated by reference in its entirety.

In some embodiments, the speed parameter is determined simply as K×(measure of variation of frequency offset measurements) where K is a constant determined empirically or experimentally.

The speed parameter is determined as a function of variation in the frequency offset measurements. Various specific examples of this will now be described. A speed parameter is a parameter that is somehow reflective of the speed of the mobile device. To name a few specific examples, this might be an absolute or differential speed value, a categorization of speed into one of a plurality of ranges, an indication of a change of categorization of speed according to a plurality of ranges.

In some embodiments, the speed is estimated as:

$$\text{Speed} = 1.1 \times \frac{F\_\text{offset\_var}}{\text{time interval}}$$

where F_offset_var is as defined above. More generally, the relationship to speed will depend on the form of the measure of frequency offset variation. The factor 1.1 is explained as follows:

$$\text{Speed} = \frac{\Delta f}{f} \times \text{speed of light (Km/h)} = \frac{\Delta f}{f} \times 3 \times 10^8 \times 3.6$$

In some embodiments, a set of two or more speed ranges are defined, and the variation in timing offset (or frequency offset) is used to categorize the speed of the mobile device into one of the two or more ranges.

In a specific embodiment, two ranges are defined. For example, it has been observed that there is a band of separation between driving (or fast changing environment) speeds and pedestrian (slow varying environment) speeds. A first range of frequency offset variation (however defined) is defined to correspond with pedestrian speeds, for example the range of 0 to 10 km/h. A second range of frequency offset variation is defined to correspond with vehicular speeds, for example, the range above 35 km/h. These ranges are for the purpose of example only; different and/or additional ranges may be used. Thresholds in the measure of frequency offset variation can be used to distinguish between the different speed ranges. Note that, as indicated previously, this approach does not distinguish actual speed of the device from environmental effects.

In some embodiments, the above-described PDF-based approach is used. The measure of variation in frequency offset, as determined from the estimated PDF, is converted to a speed parameter. When observing the measurement data of the AFC, for a stationary or pedestrian case (or a serene environment) frequency offset will have a very narrow spread of distribution. As the mobile device speed increases (or for the rapid environment change), this spread will widen. In some embodiments, having determined the measure of variability of frequency offset from the PDF, this is used to determine one of a plurality of speed ranges; in other embodiments, the measure is converted to an actual speed estimate. A sample probability density function (PDF) for the distributions associated with these two cases is shown in the FIG. 5.

Figure 5:
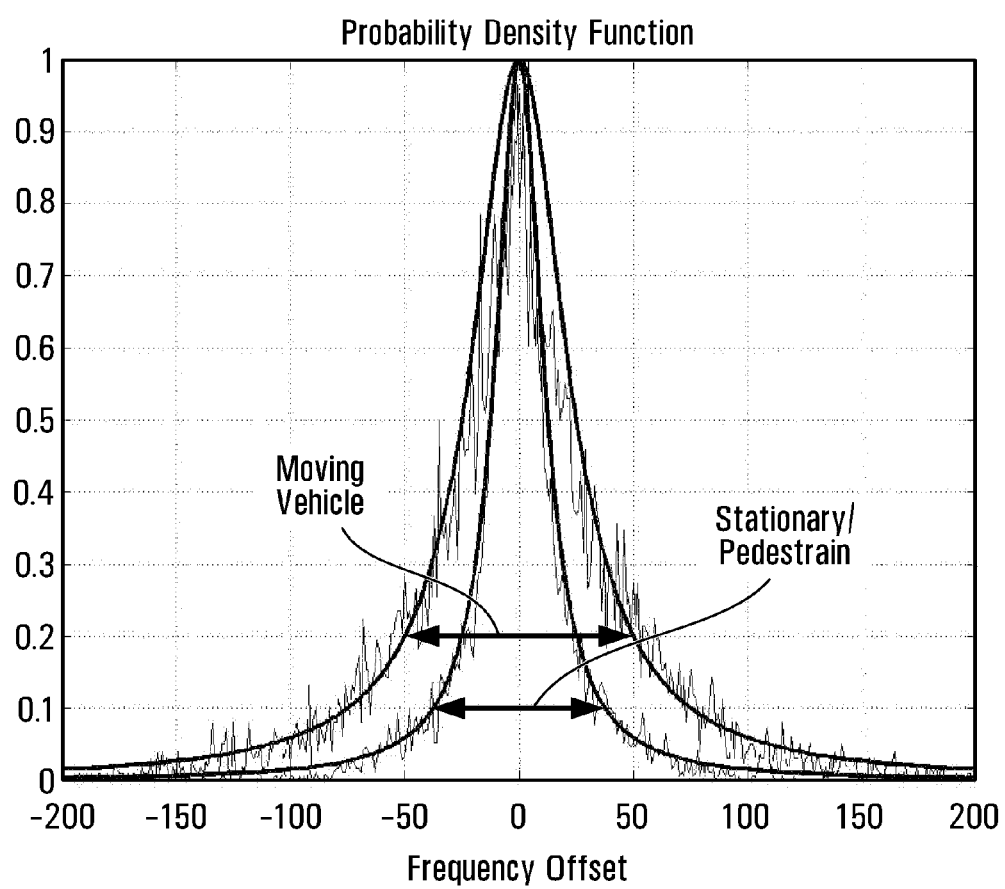
FIG. 5 is a PDF of frequency offset for a moving vehicle and a stationary user.
Figure 6:
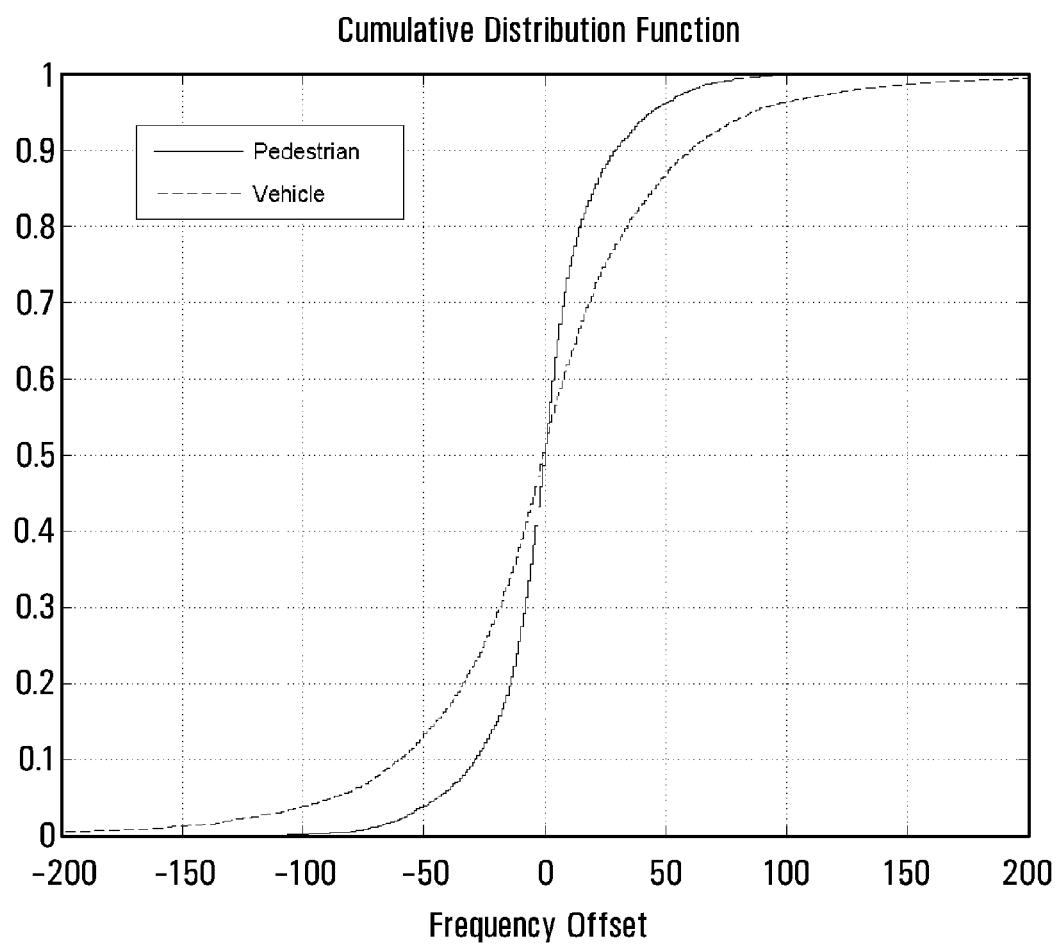
FIG. 6 is a CDF corresponding to the PDF of FIG. 5.

For the two cases of FIG. 5, the above referenced Cauchy distribution with, t=0, s=12.5 for stationary case and s=25 yield a good approximation for vehicular speeds. These data are obtained from measurement data. The difference can be easily observed on the Cumulative Distribution as shown in FIG. 6.

In some embodiments, the minimum width of the PDF for the stationary case (which is similar to the pedestrian case) is due to the inherent limit of the accuracy for the AFC loop and it could be attributed to the noise in the feedback loop, short-term temperature drift, DSP resolution limits, etc. This width may set the lower limit for the speed estimate.

The period of frequency offset measurement is typically set by the service providers and this may for example be every 0.5 seconds. With this set interval the frequency offset measurement between two successive measurements will diverge in direct proportionality to the speed of the mobile. However there exists a lower limit for the speed detection and it can be calculated as follows:

$$v = \frac{\Delta f}{f}(3e8)(3.6) \text{ km/h}$$

For example, if the possible frequency accuracy of the system is 0.4 ppm, then at 900 MHz, the frequency error will be +/−36 Hz. The possible worst case frequency error of a stationary mobile is 72 Hz over one second period. Since the frequency measurement is updated every 0.5 seconds, the error will be 36 Hz and this will correspond to a speed of $$v = \frac{36}{0.9e9}(3e8)(3.6) = 48 \text{ km/h}$$

This would be the worst instantaneous case. However, if one were to average 20 data points, eliminate the temperature compensation and other requirements, the speed will reduce to 20 km/h or less. This will imply that speed threshold can be set for 20 km/h, which will be well above the pedestrian speed and at the same time it will be within typical speed limits of 40 km/h.

Measurement Results

In this section sample measurement data is provided. The measurement data presented here is for the case of mobile devices in a GPRS/EDGE network although a similar approach can be taken for narrow band CDMA or WCDMA. In these cases of WCDMA and CDMA networks, the measurement data will be taken from more than one code channel (fingers), which corresponds to taking measurement from more than one base station.

Figure 7:
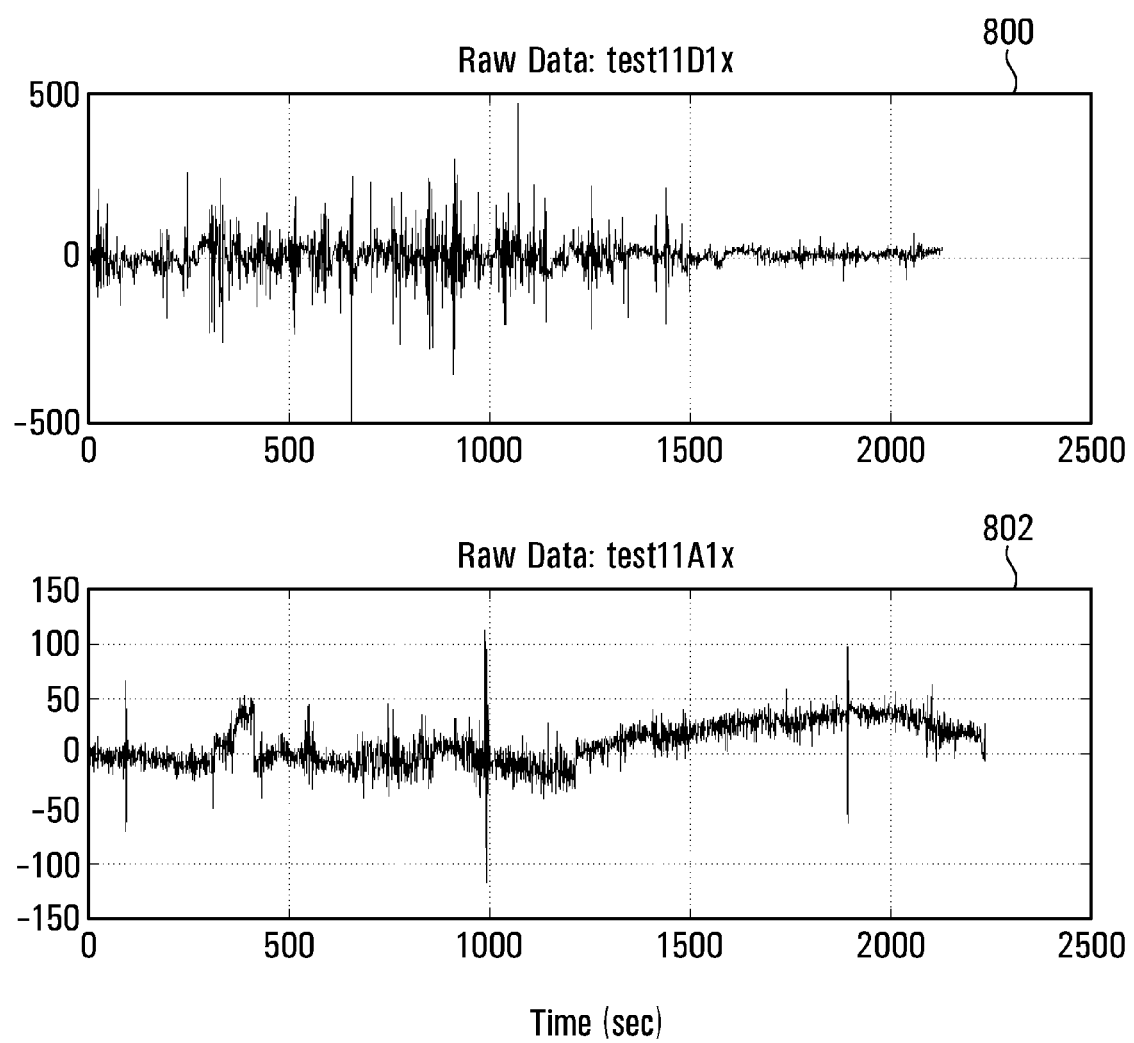
FIGS. 7 and 8 contain plots of raw test data.

A large amount of data was collected in several cities under various conditions. In the interest of conciseness, two cases are presented. FIG. 7 shows raw measurement data for the frequency offset seen at the mobile device when camped on a real GPRS/EDGE Network. The data was logged for two different cases. The first case is for a mobile device traveling within a vehicle on city streets at city speeds, then on a highway at highway speeds, and finally back in the city at very low speed (less than 15 km/h). The second case is for a mobile device carried by a pedestrian walking through different levels and throughout a building.

Figure 8:
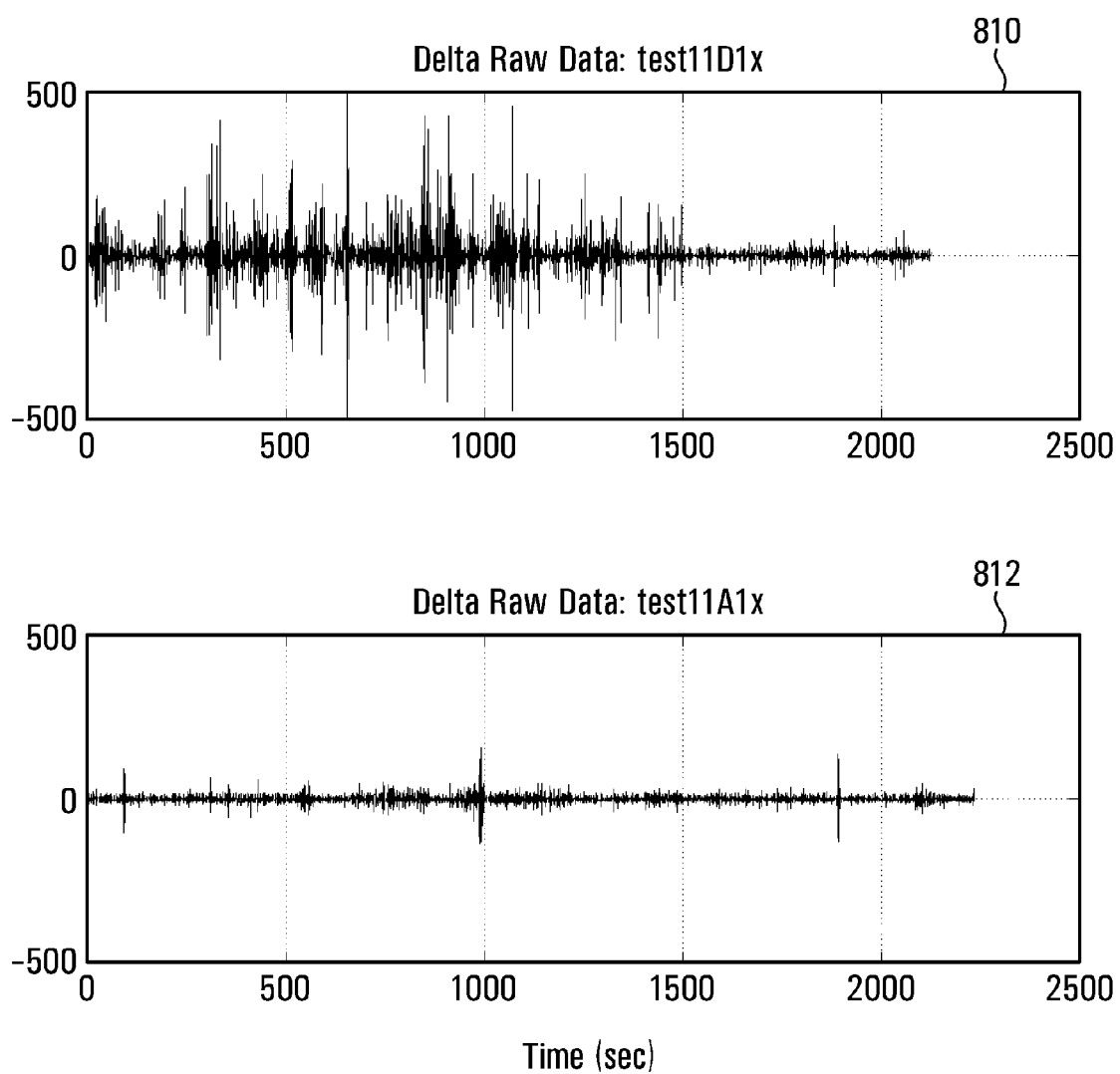

FIG. 7 shows raw test data for the two cases. The vertical axis shows the frequency offset as a function of time on the horizontal axis. Specifically, the y-axis is the measured frequency offset between the received RF signal and the mobile expected frequency, and the x-axis is time in seconds. Generally indicated at 800 is the data for the first case, and generally indicated at 802 is the data for the second case. The data seen in FIG. 7 shows that in both cases there seems to be a large variation in frequency offset measurement, which is due to an artifact in the design of the mobile device used for the tests. The Automatic Frequency Control (AFC) loop used for synchronization allows the correction to drift within a certain band of error. This is important so as to avoid unnecessary rapid correction changes that may occur in deep fading situations. FIG. 8 shows the same data set when the delta between the successive measurements is considered, referred to as "delta raw data". The delta raw data for the first case is generally indicated at 810, and the delta raw data for the second case is generally indicated at 812. This is equivalent to removing the DC offset in the AFC loop. Here one can easily observe the distinct difference between the two cases of pedestrian and the vehicle. The variation in the frequency error measurement for the pedestrian is very small.

In some embodiments, a maximum change in frequency offset over an observation period is determined and this is converted to a speed parameter as described previously. In some embodiments, the speed parameter thus determined is used as a new channel quality parameter.

Advantageously, with this approach, there is no requirement for storage of a large amount of data. This approach is applied to the data for the first and second cases defined above, and the result is plotted in FIG. 9. Specifically, a frequency offset variation is determined as a maximum change in frequency offset over a 20 second interval, and the result is converted to a speed estimate:

$$1.1 \times F\_offset\_var / 20$$

Figure 9:
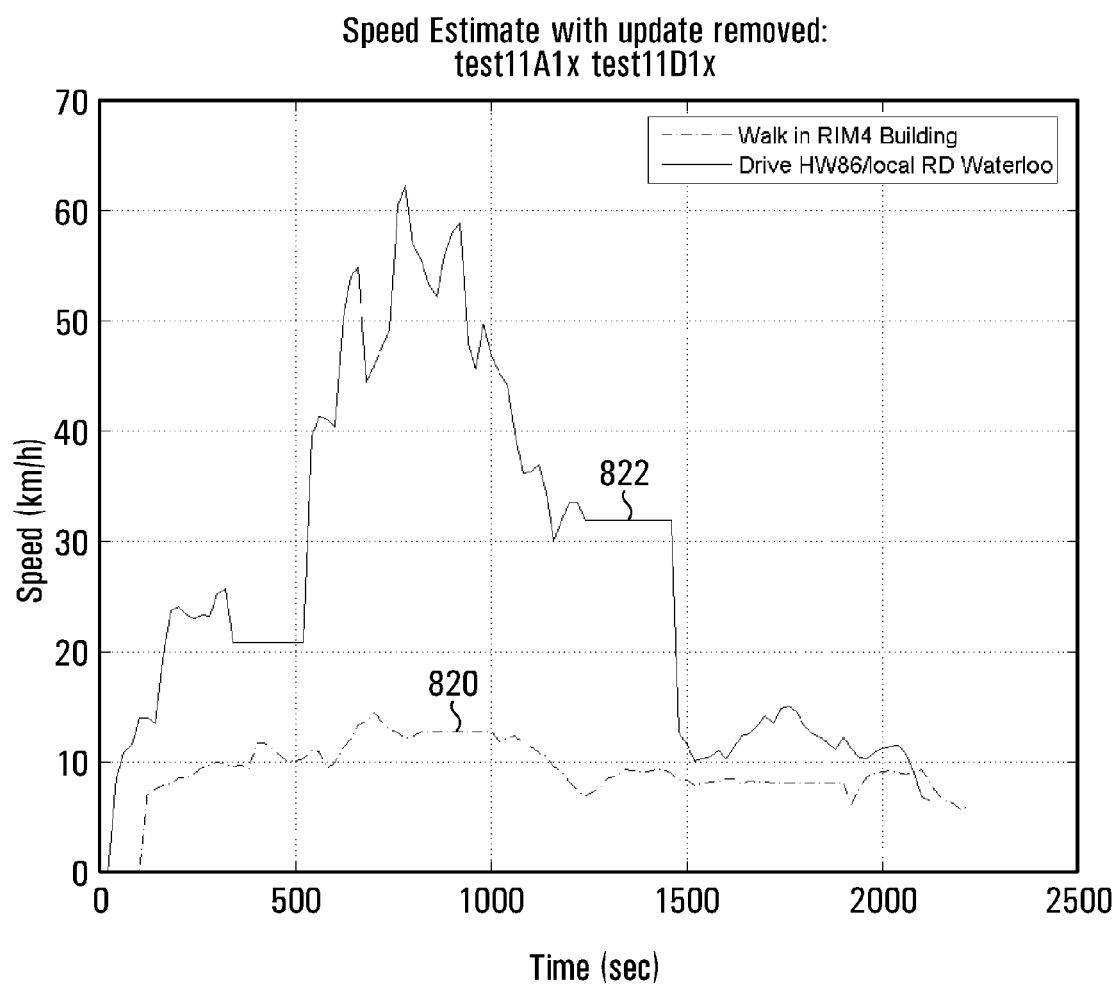
FIG. 9 shows plots of speed estimates as a function of frequency offset variation.

In FIG. 9, curve 820 shows the speed estimate computed from data for the first case, while curve 822 shows the speed estimate computed from the data for the second case.

Figure 10:
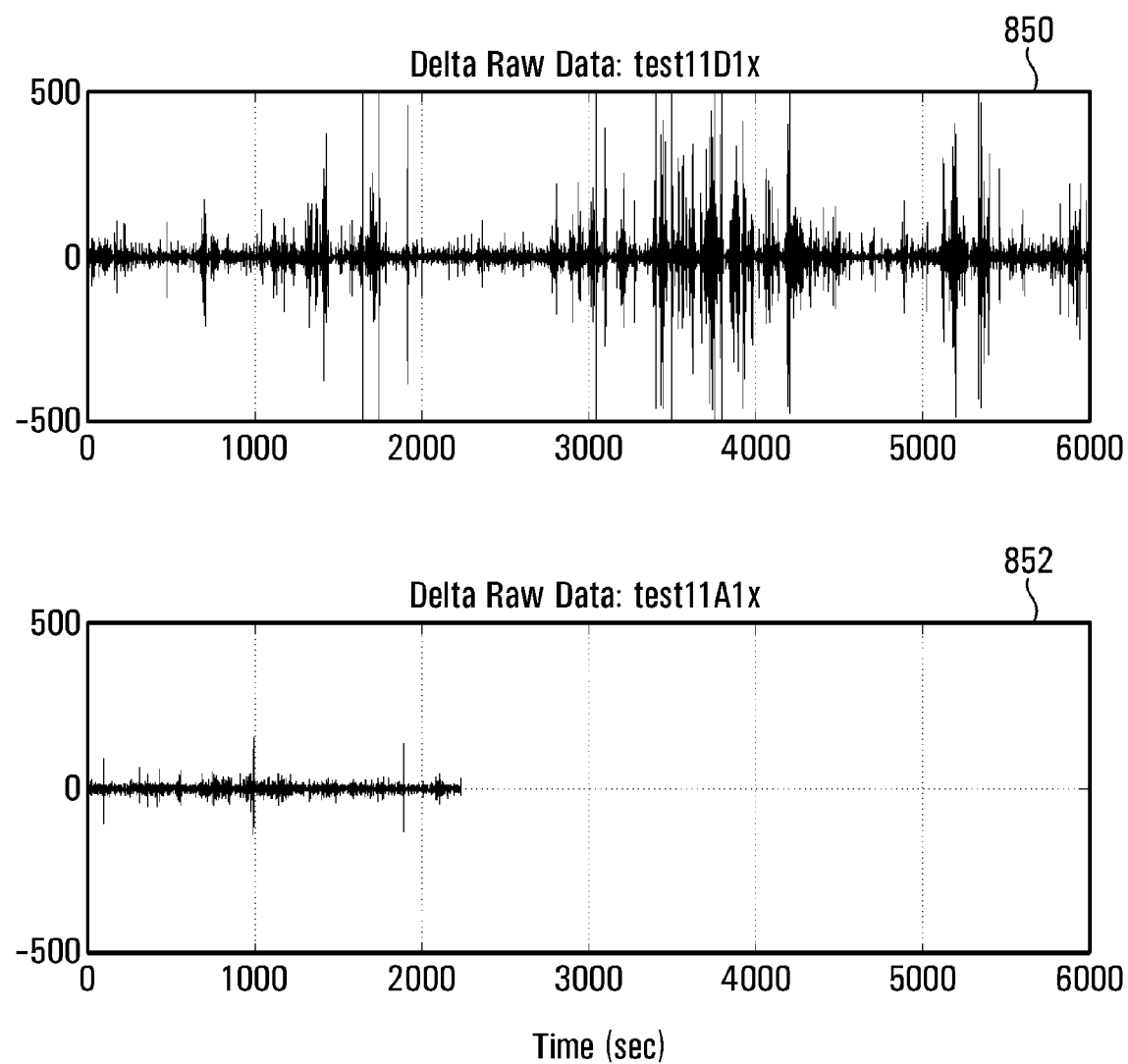
FIG. 10 is a plot of further raw test data.
Figure 11:
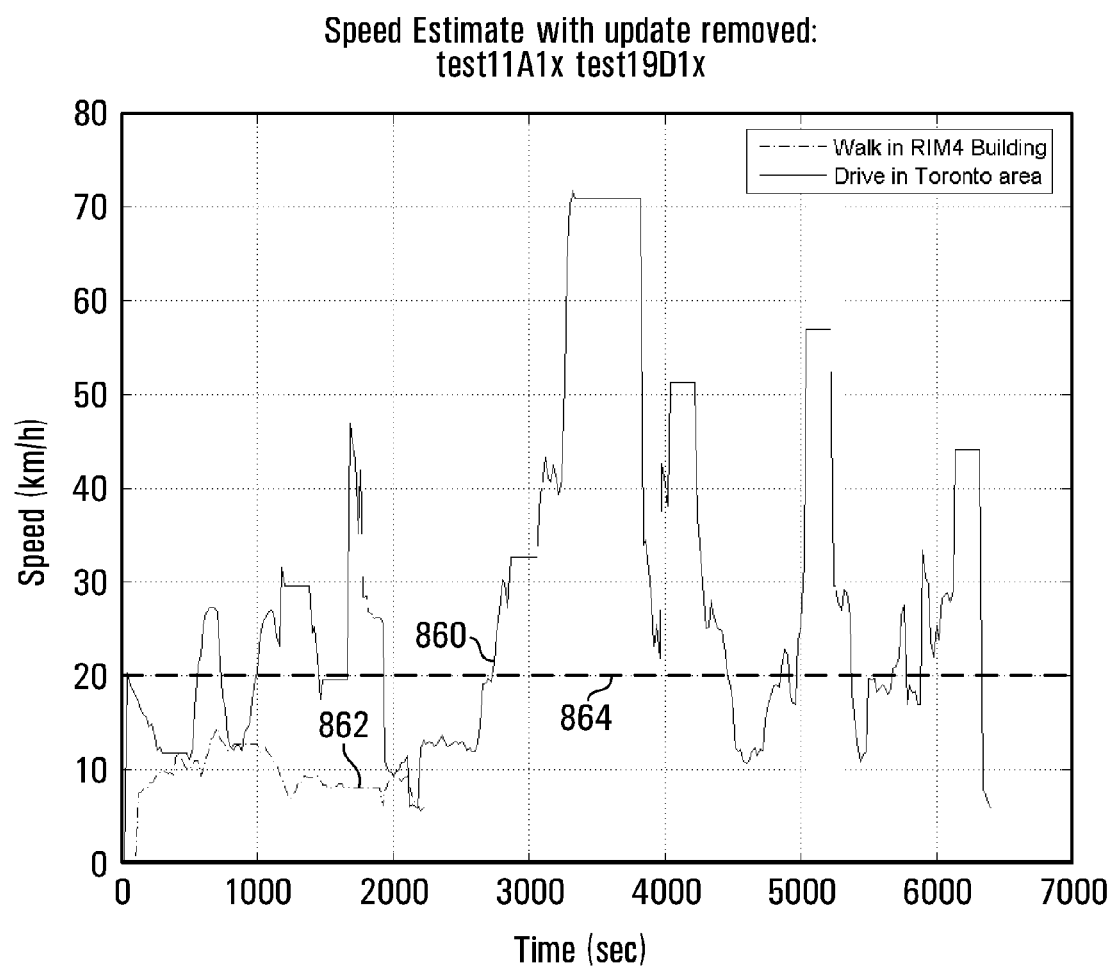
FIG. 11 is a plot of further speed estimates as a function of frequency offset variation.

FIGS. 10 and 11 are plots of further data taken under different conditions. Specifically, FIG. 10 shows the delta raw data for a further pedestrian case generally indicated at 850, and shows the delta raw data for a further vehicle case for a drive through street and HW401 in the Toronto area, generally indicated at 852. In that drive, there were many stops done in addition to the traffic lights. FIG. 11 shows speed estimates determined from the delta raw data using the method described previously. Specifically, curve 860 is a plot of speed estimate for the further pedestrian case, and curve 862 is a plot of speed estimated for the further vehicle case. One can easily pick up the stops from the plots. The straight dashed line in the figure indicated at 864 corresponds to the speed of 20 km/h and might, for example, be used as a threshold for selecting between pedestrian vs. vehicular speeds.

Another Mobile Device

Figure 12:
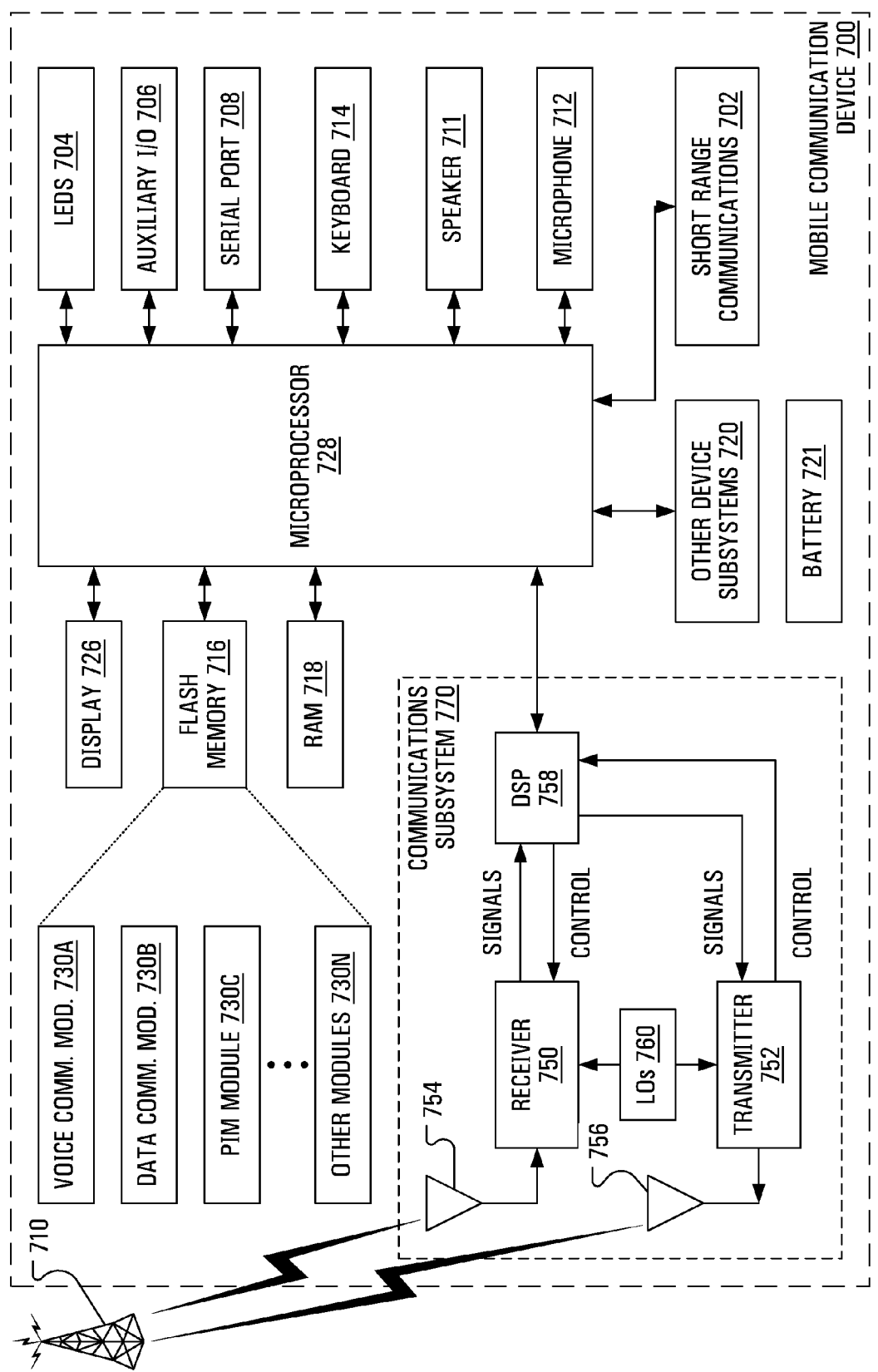
FIG. 12 is a block diagram of a mobile device.

Referring now to FIG. 12, shown is a block diagram of a mobile communication device 700 that may implement mobile device related methods described herein. It is to be understood that the mobile device 700 is shown with very specific details for example purposes only.

A processing device (a microprocessor 728) is shown schematically as coupled between a keyboard 714 and a display 726. The microprocessor 728 controls operation of the display 726, as well as overall operation of the mobile device 700, in response to actuation of keys on the keyboard 714 by a user.

The mobile device 700 has a housing that may be elongated vertically, or may take on other sizes and shapes (including clamshell housing structures). The keyboard 714 may include a mode selection key, or other hardware or software for switching between text entry and telephony entry.

In addition to the microprocessor 728, other parts of the mobile device 700 are shown schematically. These include: a communications subsystem 770; a short-range communications subsystem 702; the keyboard 714 and the display 726, along with other input/output devices including a set of LEDS 704, a set of auxiliary I/O devices 706, a serial port 708, a speaker 711 and a microphone 712; as well as memory devices including a flash memory 716 and a Random Access Memory (RAM) 718; and various other device subsystems 720. The mobile device 700 may have a battery 721 to power the active elements of the mobile device 700. The mobile device 700 is in some embodiments a two-way radio frequency (RF) communication device having voice and data communication capabilities. In addition, the mobile device 700 in some embodiments has the capability to communicate with other computer systems via the Internet.

Operating system software executed by the microprocessor 728 is in some embodiments stored in a persistent store, such as the flash memory 716, but may be stored in other types of memory devices, such as a read only memory (ROM) or similar storage element. In some embodiments, the RAT-specific routing information are stored in the flash memory 716. In some embodiments, the RAT-specific flow control parameters are also stored in the flash memory 716. In addition, system software, specific device applications, or parts thereof, may be temporarily loaded into a volatile store, such as the RAM 718. Communication signals received by the mobile device 700 may also be stored to the RAM 718.

The microprocessor 728, in addition to its operating system functions, enables execution of software applications on the mobile device 700. A predetermined set of software applications that control basic device operations, such as a voice communications module 730A and a data communications module 730B, may be installed on the mobile device 700 during manufacture. In addition, a personal information manager (PIM) application module 730C may also be installed on the mobile device 700 during manufacture. The PIM application is in some embodiments capable of organizing and managing data items, such as e-mail, calendar events, voice mails, appointments, and task items. The PIM application is also in some embodiments capable of sending and receiving data items via a wireless network 710. In some embodiments, the data items managed by the PIM application are seamlessly integrated, synchronized and updated via the wireless network 710 with the device user's corresponding data items stored or associated with a host computer system. As well, additional software modules, illustrated as other software module 730N, may be installed during manufacture.

The routing information selection function described previously is an example of functionality that is included in a software module stored in memory. Information identifying the mobile device can be stored in the Flash Memory 716 or RAM 718. The information identifying the mobile device is transmitted to the routing information configuration server, via the wireless network 710 using transmitter 752 and antenna 756. Configuration information received from the routing information configuration server for configuring the RAT-specific routing information on the mobile device is received via the wireless network 710 over the air by antenna 754 and receiver 750. It may alternatively be preloaded at factory time or configured manually by the user or IT administrator. The configuration information may be stored in the Flash Memory 716 or RAM 718.

Communication functions, including data and voice communications, are performed through the communication subsystem 770, and possibly through the short-range communications subsystem 702. The communication subsystem 770 includes a receiver 750, a transmitter 752 and one or more antennas, illustrated as a receive antenna 754 and a transmit antenna 756. In addition, the communication subsystem 770 also includes a processing module, such as a digital signal processor (DSP) 758, and local oscillators (LOs) 760. The specific design and implementation of the communication subsystem 770 is dependent upon the communication network in which the mobile device 700 is intended to operate. For example, the communication subsystem 770 of the mobile device 700 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Other types of data and voice networks, both separate and integrated, may also be utilized with the mobile device 700. The particular devices under consideration here are multi-mode mobile devices, and as such they include hardware and/or software for implementing at least two RATs. More specifically, in a particular example, there would be a respective communication subsystem 770 for each RAT implemented by the device.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 700 may send and receive communication signals over the communication network 710. Signals received from the communication network 710 by the receive antenna 754 are routed to the receiver 750, which provides for signal amplification, frequency down conversion, filtering, channel selection, etc., and may also provide analog to digital conversion. Analog-to-digital conversion of the received signal allows the DSP 758 to perform more complex communication functions, such as demodulation and decoding. In a similar manner, signals to be transmitted to the network 710 are processed (e.g., modulated and encoded) by the DSP 758 and are then provided to the transmitter 752 for digital to analog conversion, frequency up conversion, filtering, amplification and transmission to the communication network 710 (or networks) via the transmit antenna 756.

In addition to processing communication signals, the DSP 758 provides for control of the receiver 750 and the transmitter 752. For example, gains applied to communication signals in the receiver 750 and the transmitter 752 may be adaptively controlled through automatic gain control algorithms implemented in the DSP 758.

In a data communication mode, a received signal, such as a text message or web page download, is processed by the communication subsystem 770 and is input to the microprocessor 728. The received signal is then further processed by the microprocessor 728 for an output to the display 726, or alternatively to some other auxiliary I/O devices 706. A device user may also compose data items, such as e-mail messages, using the keyboard 714 and/or some other auxiliary I/O device 706, such as a touchpad, a rocker switch, a thumb-wheel, or some other type of input device. The composed data items may then be transmitted over the communication network 710 via the communication subsystem 770.

In a voice communication mode, overall operation of the device is substantially similar to the data communication mode, except that received signals are output to a speaker 711, and signals for transmission are generated by a microphone 712. Alternative voice or audio I/O subsystems, such as a voice message recording subsystem, may also be implemented on the mobile device 700. In addition, the display 726 may also be utilized in voice communication mode, for example, to display the identity of a calling party, the duration of a voice call, or other voice call related information.

The short-range communications subsystem 702 enables communication between the mobile device 700 and other proximate systems or devices, which need not necessarily be similar devices. For example, the short-range communications subsystem may include an infrared device and associated circuits and components, or a Bluetooth™ communication module to provide for communication with similarly-enabled systems and devices.

The AFC functionality described previously which determines the frequency offset might for example be implemented as part of DSP section 758. The speed parameter and/or channel quality parameter determination might for example be done in the processor section 728.

Numerous modifications and variations of the present application are possible in light of the above teachings. It is therefore to be understood that within the scope of the appended claims, the application may be practiced otherwise than as specifically described herein.

We claim:

1. A method comprising:
    receiving a signal over a wireless communications channel;
    making a plurality of frequency offset measurements in respect of the signal;
    estimating a PDF of the frequency offset measurements;
    determining at least one of a channel quality parameter and a speed parameter as a function of the PDF;
    determining the measure of variation from the PDF.

2. The method of claim 1 wherein determining at least one of a channel quality parameter and a speed parameter as a function of the PDF comprises determining a width of the PDF.

3. A method comprising:
    receiving a signal over a wireless communications channel;
    making a plurality of frequency offset measurements in respect of the signal;
    determining differences between consecutive frequency offset measurements;
    determining at least one of a channel quality parameter and a speed parameter as a function of the differences between consecutive frequency offset measurements.

4. The method of claim 3 wherein determining at least one of a channel quality parameter and a speed parameter as a function of the differences between consecutive frequency offset measurements comprises determining a maximum difference over an observation period.

5. The method of claim 3 wherein determining a speed parameter comprises:

speed=$K \times$(measure of variation of frequency offset measurements based on differences between consecutive offset measurements)

where K is a constant.

6. The method of claim 3 further comprising:
transmitting an indication of at least one of the channel quality parameter and the speed parameter.

7. A mobile device comprising:
at least one antenna for receiving a signal;
a local frequency source;
a frequency offset determiner configured to determine frequency offset measurements between a frequency of the local frequency source and a frequency of the signal;
a parameter determiner configured to determine a PDF of the frequency offset measurements and to determine at least one of a channel quality parameter and a speed parameter as a function of the PDF.

8. The mobile device of claim 7 wherein the frequency offset determiner comprises an automatic frequency controller configured to make adjustments to the frequency of the local frequency source to synchronize with a remote frequency source, wherein the adjustments to the frequency are used as said frequency offset measurements.

9. The mobile device of claim 8 wherein the parameter determiner is configured to determine at least one of a channel quality parameter and a speed parameter by determining a width of the PDF.

10. A mobile device comprising:
at least one antenna for receiving a signal;
a local frequency source;
a frequency offset determiner configured to determine frequency offset measurements between a frequency of the local frequency source and a frequency of the signal;
a parameter determiner configured to determine differences between consecutive frequency offset measurements and at least one of a channel quality parameter and a speed parameter as a function of the differences between frequency offset measurements.

11. The mobile device of claim 10 wherein the parameter determiner is configured to determine at least one of a channel quality parameter and a speed parameter as a function of the differences between frequency offset measurements by determining a maximum difference over an observation period.

12. The mobile device of claim 10 wherein the parameter determiner is configured to determine the speed parameter by:

$$\text{speed} = K \times (\text{measure of variation of frequency offset measurements based on differences between frequency offset measurements})$$

where K is a constant.

13. A computer readable medium having instructions stored thereon for execution by a mobile device, that when executed, cause the mobile device to execute a method comprising, in respect of a signal received over a wireless communications channel:
making a plurality of frequency offset measurements in respect of the signal;
estimating a PDF of the frequency offset measurements;
determining at least one of a channel quality parameter and a speed parameter as a function of the PDF.

* * * * *